Patented Apr. 5, 1938

2,113,471

UNITED STATES PATENT OFFICE 2,113,471

ART OF PRODUCING BUTANOL AND ACETONE BY FERMENTATION OF MOLASSES

Rafael Arroyo, Rio Piedras, P. R., assignor, by mesne assignments, to The Lummus Company, New York, N. Y., a corporation of Delaware No Drawing. Application March 13, 1934, Serial No. 715,374. Renewed April 11, 1936

14 Claims. (Cl. 195—46)

The present invention relates to the art of obtaining butanol and acetone by a fermentation procedure, in which the fermentable substrate may be produced directly from a final sugarhouse molasses and in which a high yield of butanol is obtained.

While it is known to obtain butanol and acetone by the fermentation of starches; as developed by Fernbach, Weizmann and others, and as described in the Weizmann Patents 1,315,585; 1,329,214; and 1,437,697; it has been found that the bacteria are highly selective in their action, and the procedures require a mash of cereal or nutty nature; and that the bacteria do not operate upon the constituents of molasses. The Robinson Patent 1,510,526 describes a procedure in which the bacteria are developed and cultivated upon a substrate of corn or other cereal mash, and molasses is added during the course of this normal fermentation, the patentee pointing out the poisoning or toxic effect of the molasses with respect to the bacteria employed: i. e., molasses alone is not a proper inoculum for such bacteria.

It has now been found, however, that a simple and direct fermentation of molasses may be accomplished, with a yield much higher than that of the bacteria described in the prior art, by employing a particular type of bacteria for this purpose.

*Source.*—From roots of the Kassoer variety of cane.

*Name.*—B. tetryl (new species).

I. Morphology

1. Vegetative cells motile in early stages, motility becoming less pronounced as the culture becomes older, and finally is lost almost entirely in old cultures. Facultatively anaerobic.

*Media used.*—Molasses of 4–6° Brix density, the sucrose of which is inverted by the addition of sulphuric acid at the rate of 1.5 cc. conc. acid to 1800 cc. of mash. It is then neutralized with CaCO3 at rate of 5.5 grams per above volume, and NH4OH added at rate of 1.5 cc. Temp. of incubation 35° C. Age 24 hrs. Colonies then established by plating on malt gelatine agar on inverted plates. Acclimatable to densities in excess of 12° Brix.

*Form.*—Rods varying in length, occurring singly and in short and long chains. Peritrichous flagella.

*Size.*—1.5 x 5.6 microns. Ends rounded.

*Stain.*—Stain readily with gentian violet or methylene blue or carbol fuchsine. Gram positive.

2. *Sporangia.*—Media used—6° Brix inverted molasses sol. as above described.

*Form.*—Elliptical.

*Spores.*—Polar, and resistant to ordinary methods used for staining vegetative cells. Forms endospores in almost all media; while organism still motile.

II. Cultural features

1. Slightly raised growth on malt gelatine agar slants after 24 hrs. at 35° C., facultative anaerrobe; non-liquefying gelatine.

In malt gelatine agar stabs growth filiform. Surface growth on agar; scanty on agar stroke; dull in luster; smooth surface. Agar colonies circular, diameter undetermined.

2. Good growth on potato plugs at 35° C., produces gas and foam which sometimes rise above the plug.

Good growth in malt agar with calcium carbonate; and in potato dextrose sugar stabs; at first filiform growth, later splitting the agar and becomes spreading with gas formation. Gas from glucose and acid culture; gas from sucrose culture under methods and on medium prescribed by American Bacteriological Society, but apparently only because of presence of sugar inverted by heating during sterilization.

*Little growth* in media without sugars.

*No growth.*—Cohn's solution, Dunham's solution, NO3 peptone solution.

Sugar broth becomes cloudy with formation of a white ppt.

Litmus milk becomes acid with formation of gas and reduction of litmus: curding present but rennet curding absent: peptonization present and positive: indole production negative.

III. Physical and biochemical features

1. *Fermentation tubes.*—Substances fermented with gas evolution.

|  | 12 hours | 40 hours | 63 hours | |
|---|---|---|---|---|
|  |  |  | Gas | Acid |
| Sucrose | 0 | 0 | 0 | 0 |
| Maltose | xx | xxx | x | x |
| Lactose | x | xx | x | x |
| Dextrose | xx | xxxx | x | x |
| Levulose | xx | xxxx | x | x |
| Starch | 0 | 0 | 0 | 0 |
| Manitol | x | xx | x | x |

0—absent, x—present, xx—strong, xxx—very strong, xxxx—strongest.

Further, cultures in mannose, salicin, galactose, inositol, melezitose, glycogen and sorbitol gave negative results at the end of six days; while cultures in 1-arabinose, inulin, and fructose gave positive acid (xxx) and gas (xxx) indications in three to four days.

Butanol (butyl alcohol), acetone and a small quantity of ethanol (but no iso-propanol) are produced in the fermentation of the lower sugars (monoses), but the organism is incapable of producing these products from sucrose, or to hydrolyze sucrose into invert sugars. The gases formed are carbon dioxide and hydrogen. *B. tetryl* grows in starchy mashes, but does not produce either butanol or acetone to any appreciable degree therein.

*Bacillus tetryl* is found in nature in the rind of the lower nodes of sugar cane of the Kassoer variety grown in Puerto Rico. Direct cultures in sterile mash of 5° Brix were incubated; and colonies established by plating on malt gelatine agar on inverted plates.

Propagation from the colonies, by the use of sterile molasses mash of successively increasing densities, has shown that the *B. tetryl* is acclimatable to densities in excess of 12° Brix.

A preferred procedure in fermenting molasses, to obtain butanol and acetone, comprises the solution of "black strap" final sugar-house cane molasses (for example, about—88° Brix; polarization—27.85; apparent purity—31.64; total sugars as invert—51.50) in water, by heating on a water bath with agitation, and in the proportion of 220 grams of molasses to 400 cc. of water. 3.0 cc. of strong sulphuric acid is added and the mixture autoclaved for thirty minutes at 20 pounds pressure to effect a complete inversion of the sucrose contained in the molasses. After cooling to about 50 degrees C., 12 grams of calcium carbonate and 3.0 cc. of strong (20 percent) ammonia water are added to the mash. When effervescence subsides, the mash is completed with distilled water according to the sugar concentration desired (for example 1800 cc.) and sterilized by autoclaving for 30 minutes at 20 pounds pressure. When thus prepared, this standard mash gives a pH value of 6. It has been found desirable to adjust to the pH value of 6 by the addition of N/100 sulphuric acid or N/100 sodium hydroxide as necessary.

To this mash is preferably added from one to five grams per 1000 cc. of activating agent such as kieselguhr, bone black, lamp black or activated carbon. Such an activating agent, as described in claim herein, is itself substantially inert chemically, but is a solid in a state of fine subdivision and has a large surface and a recognized adsorption power; and its action appears to be physical rather then chemical and to be of catalytic type. When lamp black is used alone, a maximum effect is obtained by using two grams. When kieselguhr is used alone, a maximum effect is obtained by using one or two grams. The apparent absolute maximum is obtained by using two grams of kieselguhr with two grams of lamp black. While it is possible to operate without the employment of an activating agent, the use of lamp black alone led to an increase of over fifteen percent in yield; the use of kieselguhr alone of over 12½ percent; while the use of the two activators together gives an increase of nearly 22 percent over the results attained when no activating agents were employed. Such activators operate to enable an increase in the density and sugars concentration of the mash, and to shorten the time of the fermentation period. An increase of 20 percent in yield, 24 percent in concentration, and a reduction of 30 percent in time can be obtained with activated carbon, for example.

The prepared mash is then seeded with *Bacillus tetryl* which has been acclimatized to the density of the mash so that preferably it is isotonic therewith, and propagation effected at between 30 and 39 degrees C. At the lower temperature, a greater length of time of propagation is required. At the higher temperature, an intense activity occurs for a short time and then further action ceases prior to exhaustion of the substrate. The preferred range of temperature is between 32 and 37 degrees and the optimum yield of total solvents is attained at 35 degrees C. At temperatures from 35 to 37 degrees C., the quantity of acetone increases while the quantity of butanol decreases.

At the preferred temperature of 35 degrees C., about 24 to 48 hours are required for the fermentation.

It has been found that the acidity of the mash has a striking part in determining the condition of the operation. The *Bacillus tetryl* works best under slightly acid conditions, and the optimum pH of the mash is initially around 6 (corresponding to a potentiometer reading of 90 millivolts with a quinhydrone electrode). During normal fermentation, the potentiometer reading increases steadily during the first 22 or 24 hours to a reading of about 160 millivolts (pH value of 5.0). Thereafter, the value decreases to a nearly constant value of around 125 to 130 millivolts (pH value of 5.5), which remained steady until fermentation stopped. In particular, it is found that in the event of contamination, or the presence of any inhibiting force, the acidity continues to rise, and values as high as 190 to 210 millivolts have been found. The periodic determination of acidity, therefore, furnishes an excellent control for supervising the course of the action and determining the presence of impurities or undesired factors.

It has been found that the optimum concentration of total sugars for maximum yields is between 4.50 grams and 6.00 grams per hundred cc. With increasing concentrations, a greater time is required for fermentation at 35 degrees C., ranging from 48 to 52 hours; and yielding 24.75 parts of total solvents (butanol, acetone and ethanol) per 100 parts of sugars at a sugar concentration of 3.65; 27.74 at a sugar concentration of 4.25; 27.30 at a sugar concentration of 4.55; 27.12 at a sugar concentration of 4.85; and 22.85 at a sugar concentration of 5.14. At concentrations of 8.50 grams per hundred cc. and over, no fermentation appeared to occur. The concentration of 4.85 percent sugar is to be preferred when no activators are used; but when activators are used, then concentrations of from 5.5 to 6.0 percent sugars are preferable. On a commercial basis it is therefore preferred to operate with a concentration of about 4.85 grams of total sugar per hundred cc. of mash, which has been found to yield on distillation 1.315 grams of total solvents or about 1.65 cc. Slightly lower sugar concentrations give higher yields per unit of sugar, but the increased plant capacity for fermentation and distillation involves cost factor differentials which render such lower concentrations uneconomical.

The total length of time for the fermentation, of course, depends upon the several factors as above indicated. At a temperature of 30 degrees C., 70 hours were required to obtain 23.50 percent of total solvents; at 32 degrees, 63 hours were required to obtain 24.50 percent; at 35 degrees, 49 hours were required to obtain 29.50 percent; and at 37 degrees, 38 hours were required to obtain 24.49 percent. As indicated above, 35 degrees C. is regarded as the optimum temperature of propagation and fermentation.

When the fermentation is completed, the butanol, acetone and ethanol may be distilled and recovered in the usual way.

It will be understood that the above examples are illustrative of the manner of proceeding according to the present invention. The particular dilutions, acid additions, and alkali additions to adjust the pH value will depend upon the strength of the initial material in total sugars, in sucrose, and in the general Brix density thereof; but a person skilled in the fermentation art can determine the dilutions and additions to be used and made, in accordance with the above recommendations.

A characteristic of the action of *Bacillus tetryl* upon invert sugars is the high ratio of butanol obtained thereby. While the bacillus used in the Weizmann process produces butanol, acetone and ethanol in the ratio of 6:3:1, and does not produce butanol or acetone from molasses at all, it is found that *Bacillus tetryl* produces these substances in the ratios of 14:4:1. For example, the actual production from a gallon of molasses has been caused to amount to:

| | | |
|---|---|---|
| Total solvents | 30.00% or | 1.95 pounds |
| Butanol | 22.31% or | 1.45 pounds |
| Acetone | 6.15% or | 0.40 pounds |
| Ethanol | 1.54% or | 0.10 pounds |

The capacity of *Bacillus tetryl* to produce a large quantity of butanol and an extremely low quantity of ethanol is striking.

It will be understood that the above statements with respect to the employment of *Bacillus tetryl* in effecting the conversion of the sugars of molasses to butanol and acetane are not restrictive, but that the procedure may be modified in many ways without departing from the scope of the appended claims.

Having thus described the invention, what I claim as new and desire to secure by Letters Patent, is:

1. A process of producing butanol and acetone from molasses, which consists in inverting the sucrose of the molasses, and fermenting the sterilized molasses by the action of *Bacillus tetryl*.

2. A process of producing butanol and acetone from molasses, which consists in inverting the sucrose of the molasses, and fermenting the sterilized molasses by the action of *Bacillus tetryl* in the presence of a solid adsorptive agent in a state of fine subdivision.

3. A process as in claim 2, in which the activating agent is a finely divided carbon.

4. A process as in claim 2, in which the activating agent is kieselguhr.

5. A process as claim 2, in which the activating agent is a mixtlure of keiselguhr and finely divided carbon.

6. A process of preparing butanol and acetone from final cane molasses, which comprises inverting the sucrose in the molasses, bringing the molasses to a density between 8 and 12° Brix and a pH value of substantially 6.0, seeding the dilute sterilized molasses with *Bacillus tetryl*, and fermenting at 32 to 37 degrees C.

7. A process of preparing butanol and acetone from final cane molasses, which comprises inverting the sucrose in the molasses, bringing the molasses to a density of 8.0 to 10.0° Brix and a total sugar concentration of 4.0 to 5.0 percent, seeding with *Bacillus tetryl*, and fermenting at a temperature of substantially 35 degrees C.

8. A process as in claim 6, in which at least one activating agent of the group consisting of bone black, activated carbon, and lamp black is added in a quantity totaling between 1 and 5 grams per thousand cubic centimeters.

9. A process of preparing butanol and acetone from final cane molasses, which comprises inverting the sucrose in the molasses, bringing the molasses to a density between 8 and 12° Brix and a pH value of substantially 6.0 and the sugars concentration of 5.5 to 6 percent of total sugars as invert sugars, introducing at least one activating agent of the group consisting of lamp black, bone black and activated carbon in a quantity totaling betwen one and five grams per thousand cubic centimeters, seeding the dilute sterilized molasses with *Bacillus tetryl*, and fermenting at a temperature between 32 and 37 degrees C 10. A process of producing butanol and acetone from final cane molasses which consists in inverting the sucrose of the molasses, preparing a *Bacillus tetryl* culture from the rind of the lower nodes of a Kassoer cane by propagating in sterile mash cultures of successively greater density, diluting the molasses to a density equivalent to that of the last culture medium, seeding the sterilized molasses solution with the cultivated *Bacillus tetryl*, and fermenting at a temperature of from 32 to 37 degrees C.

11. A process of preparing butanol and acetone, which comprises preparing an invert sugar solution containing between 4.25 and 4.85 grams per hundred c.c., fermenting the sterilized solution by the action of *Bacillus tetryl*, and maintaining the acidity between pH values of 6.0 and 5.0.

12. A process of producing butanol and acetone which includes the step of fermenting a wort containing dextrose by the action of *Bacillus tetryl*.

13. A process of preparing butanol and acetone which comprises the step of fermenting a wort containing levulose by the action of *Bacillus tetryl*.

14. A process of producing butanol and acetone which comprises the step of fermenting a wort containing invert sugar by the action of *Bacillus tetryl*.

RAFAEL ARROYO.